Feb. 14, 1956 H. W. CHRISTENSON 2,734,399
TORQUE CONVERTER DRIVE
Filed Dec. 10, 1949 5 Sheets-Sheet 1

Inventor
Howard W. Christenson
By
Willits, Helwig & Baillio
Attorneys

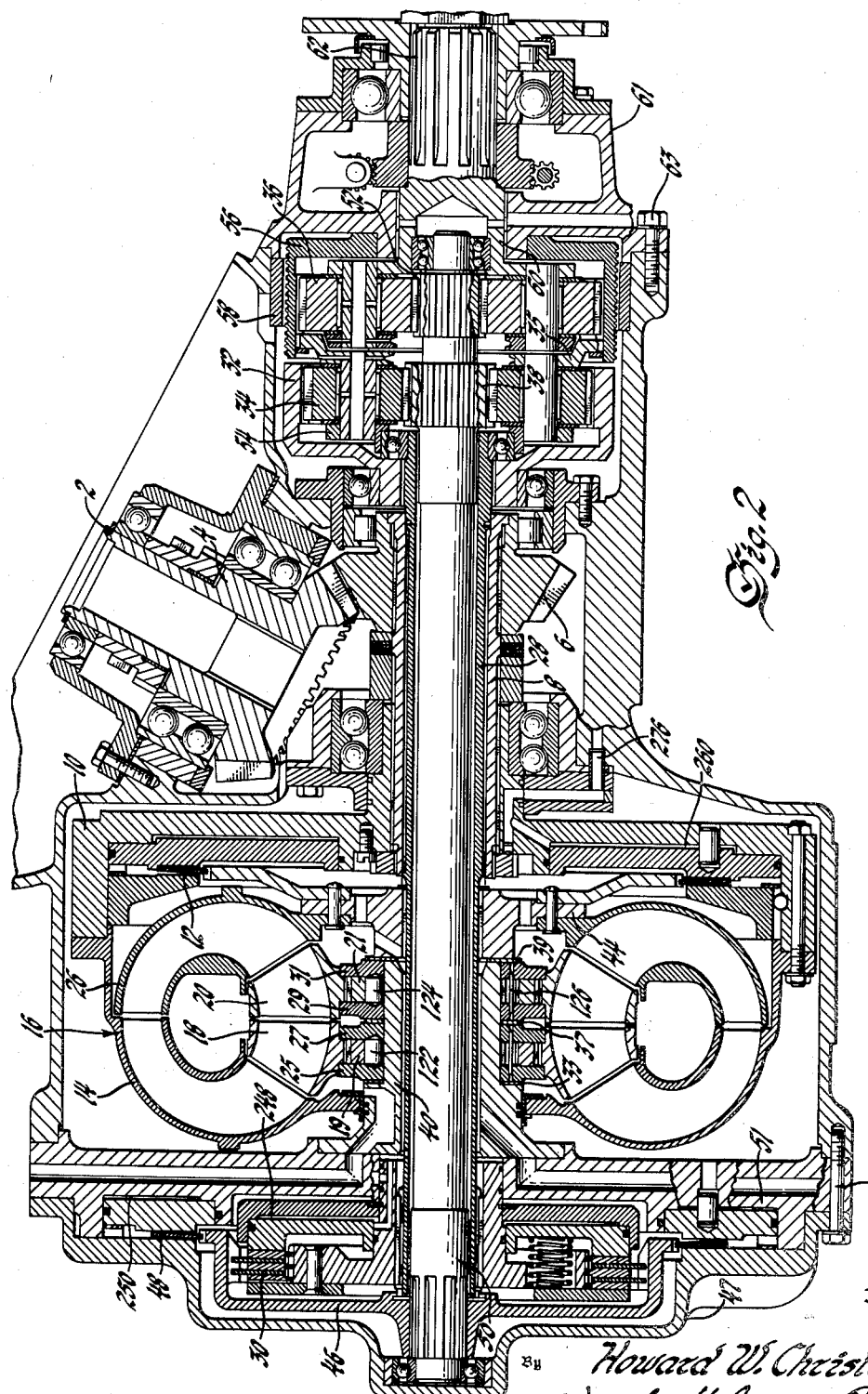

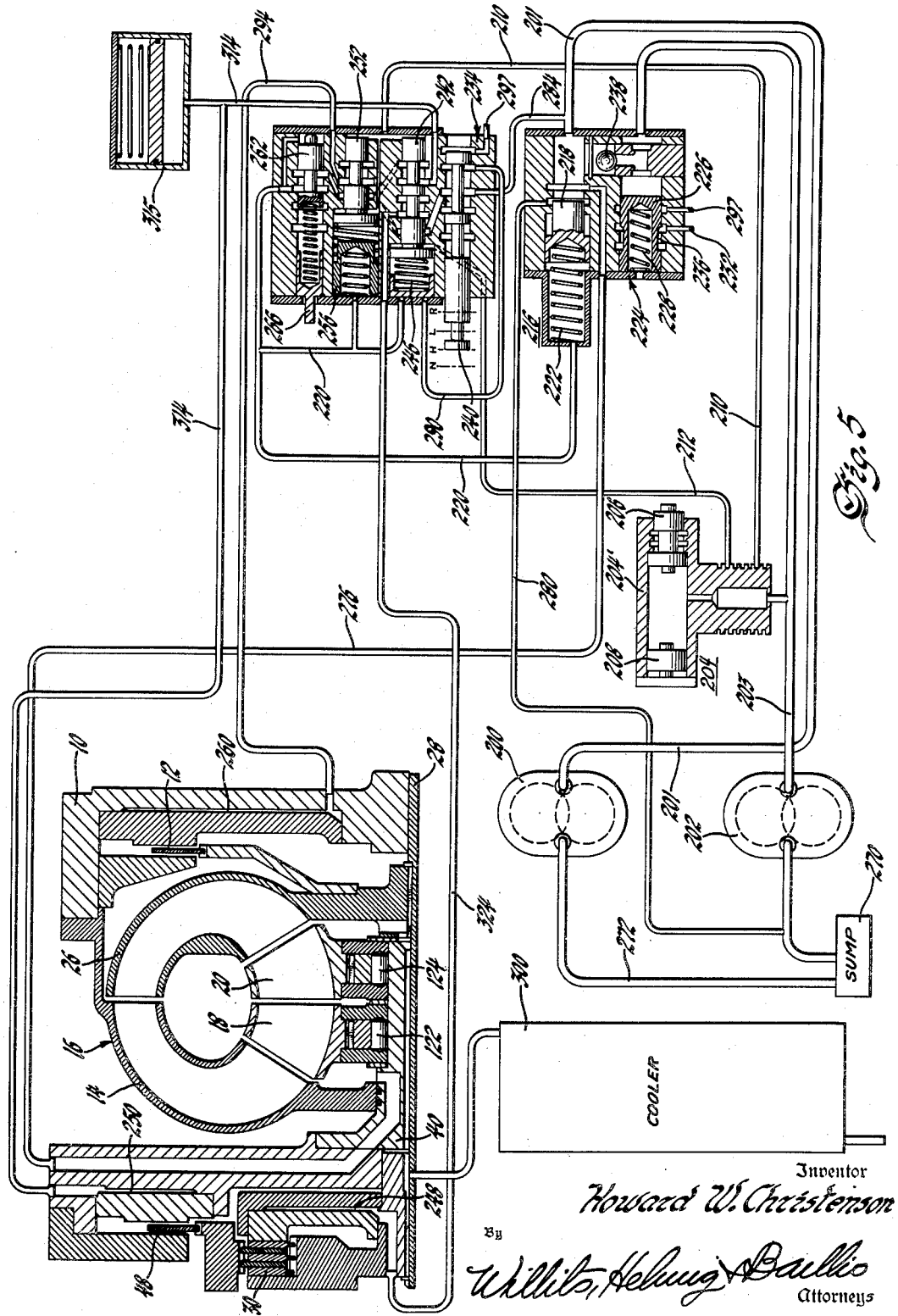

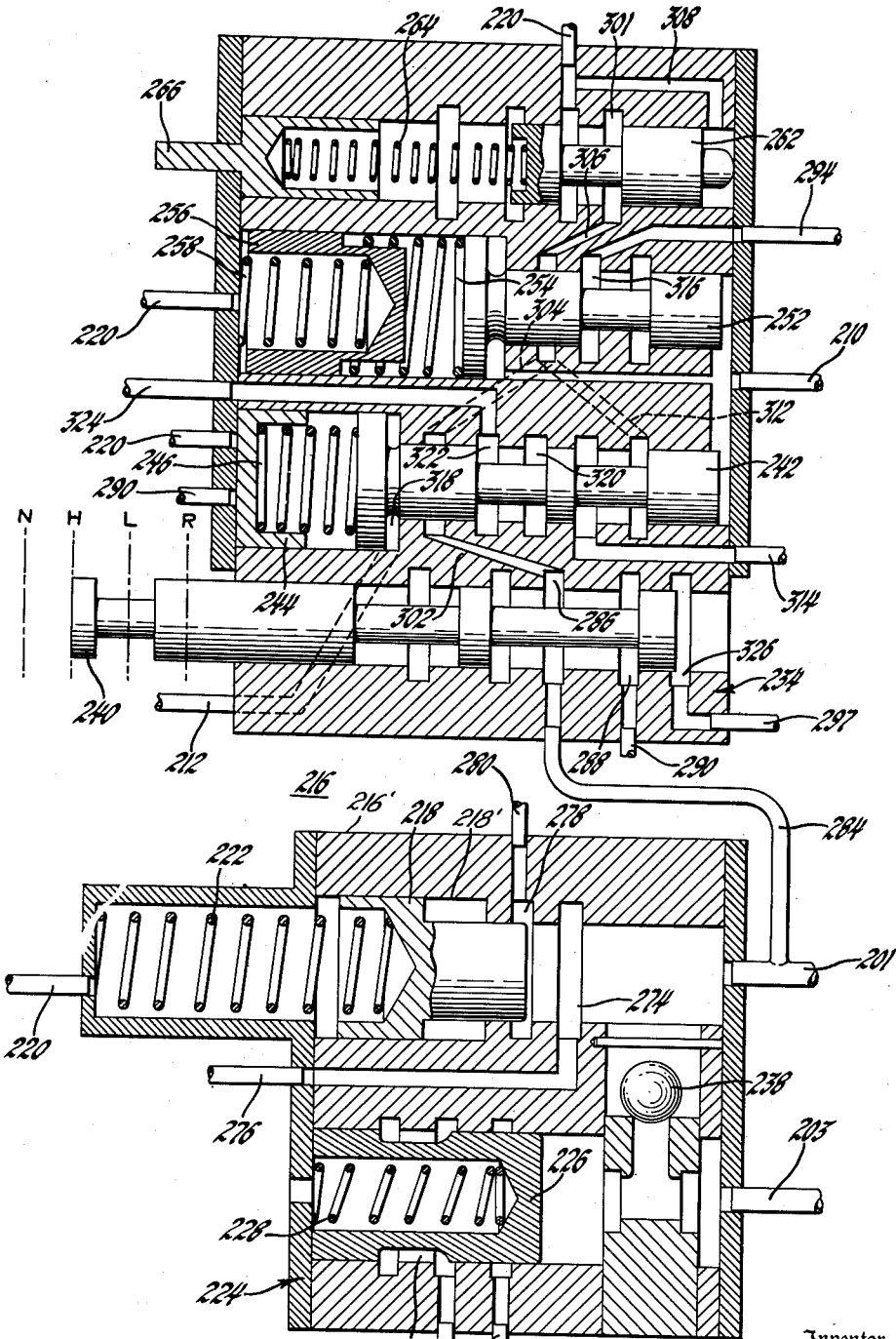

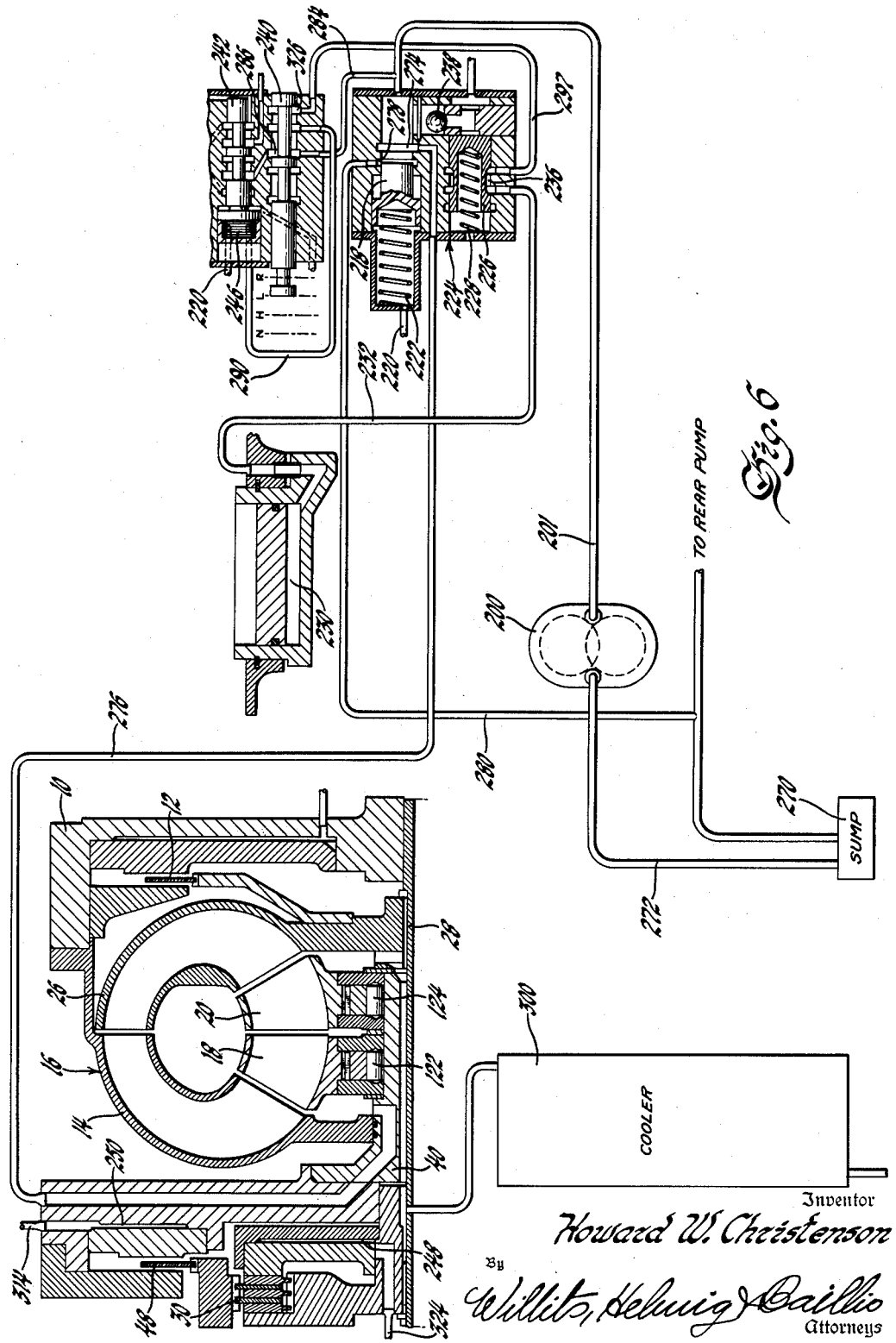

United States Patent Office 2,734,399
Patented Feb. 14, 1956

2,734,399

TORQUE CONVERTER DRIVE

Howard W. Christenson, Indianapolis, Ind., assignor to General Motors Corporation, Detroit, Mich., a corporation of Delaware Application December 10, 1949, Serial No. 132,388

16 Claims. (Cl. 74—732)

The present invention relates to angle drive vehicle power transmission mechanisms. More particularly it relates to automatic transmission combinations for vehicles.

In the past certain difficulties have been encountered in attempts to combine torque converter drives with automatic shifting change speed transmissions. These prior transmissions have usually been quite complex and difficult to service. Many of these torque converter change speed transmission combinations do not contain provisions for bypassing the torque converter to permit a direct drive connection between the power plant and the change speed transmission.

It is therefore an object of the present invention to provide an angle drive vehicle transmission including a torque converter with means for locking out the torque converter.

It is a further object of the present invention to provide an angle drive vehicle transmission which is simple in construction and convenient to service.

It is a further object of the present invention to provide a torque converter automatic transmission combination containing provision for automatically bypassing the converter with a direct connection between the power plant and the change speed transmission under preselected conditions of operation.

It is a further object of the present invention to provide a torque converter change speed transmission which may be easily assembled and disassembled.

Other objects of this invention will become apparent upon reading the specification and inspection of the drawings and will be particularly pointed out in the claims.

Referring now to the figures in the drawings, Figure 1 shows the torque converter change speed transmission schematically.

Figure 2 is a longitudinal cross section through the torque converter transmission assembly showing its physical construction.

Figure 5 shows the hydraulic system for automatically operating the torque converter change speed transmission combination.

Figure 5a is an enlarged view of a portion of Figure 5.

Figure 6 shows the hydraulic system energized for reverse gear.

Figure 1:
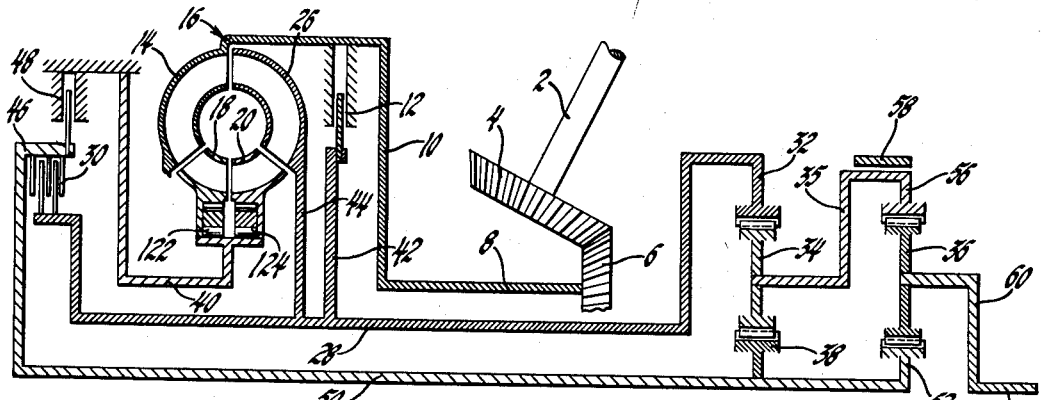

Referring now more particularly to Figures 1 and 2, it will be noted that the transmission contains a torque converter 16, one compound planetary gear train and two fluid pressure responsive friction clutches and two fluid pressure responsive brakes. These clutches and brakes are energized by the hydraulic system shown in Figures 5, 5a and 6 to obtain three forward speed ranges and one reverse speed ratio between the engine and the final drive. The torque converter is used only in low and reverse drive and is bypassed in intermediate and one-to-one forward drives.

In Figures 1 and 2, the engine driven shaft 2 is shown as carrying a bevel gear 4. This gear is meshed with a second bevel gear 6, the two gears having the proper configuration to give the desired angle drive and velocity ratio. The bevel gear 6 is connected to the torque converter impeller member by means of a hollow shaft 8. This housing member 10 is rigidly connected to the impeller 14 of the torque converter 16 and is also rigidly connected to one set of plates of the hydraulically actuated friction clutch 12. The torque converter 16 also has a turbine member 26 and two stator members 18 and 20. The clutch 12 is used to lock the impeller 14 to the turbine member 26 and thus lock up the torque converter. The stator members 18 and 20 are anchored to the frame of the converter by means of one-way brakes and the stationary member 40 which is supported from the converter housing. These brakes are described in greater detail in connection with Figures 3 and 4. The stator members 18 and 20 are mounted on one-way brake mechanisms so as to permit them to overrun their anchoring means 40 under low torque transmitting conditions and permit the operation of the torque converter substantially as a fluid coupling.

The turbine member 26 of the torque converter is rigidly attached to the hollow shaft 28 through a member 44 so as to permit the transmission of torque from the torque converter to this shaft. Under certain conditions of operation where no torque multiplication is necessary, it may be desirable to bypass the fluid circuit in the torque converter by clutching the impeller of the torque converter directly to the turbine member. It will be noted by inspection of the drawings that the clutch 12 connects the casing member 10 and hence the impeller 14 directly to the turbine member 26. This in effect connects the shaft 8 directly to the shaft 28 through member 42 so as to have a rigid connection between the engine driven shaft 2 and the planetary change speed transmission. The shaft 28 is connected to ring gear 32 and is also connected to one set of plates of the clutch 30. The other set of plates of this clutch is connected to the member 46 which carries a plate of the brake 48 and is connected to the shaft 50. These two clutches 12, 30 and brake 48 are fluid actuated in response to vehicle speed and engine torque requirements as will be described in connection with Figure 5. The shaft 50 carries sun gears 38 and 52 of two planetary gear trains. A carrier 35 supports a plurality of planetary gears 34 which mesh with the ring gear 32 and the sun gear 38. The carrier 35 is connected to the ring gear 56 of the second planetary gear train. This ring gear 56 has associated therewith a brake 58 capable of anchoring this ring gear to the casing of the transmission to obtain reverse drive. Mounted between the sun gear 52 and the ring gear 56 there is located a plurality of planet gears 36 which are supported by a carrier 60. The carrier 60 forms a part of the output member 62 which is connected in driving relationship to the wheels of the vehicle.

Referring particularly to Figure 2, it will be noted that this transmission is so constructed as to permit easy assembly, disassembly and service. For example, the plate 47 may be removed by removing screws 49 to permit assembly, disassembly and service of the clutch 30 and brake 48 and their associated actuating mechanism. By removal of these same screws, the plate 51 may be removed to permit assembly, disassembly and service of the torque converter 16 and its associated lockup clutch 12. The housing 61 is easily removable by means of screws 63 to permit access to the planetary gear train for assembly, disassembly and service. It may thus be seen that the transmission, especially the torque converter and associated clutch mechanism, may be easily serviced without removal of the transmission from the vehicle.

Figure 3:
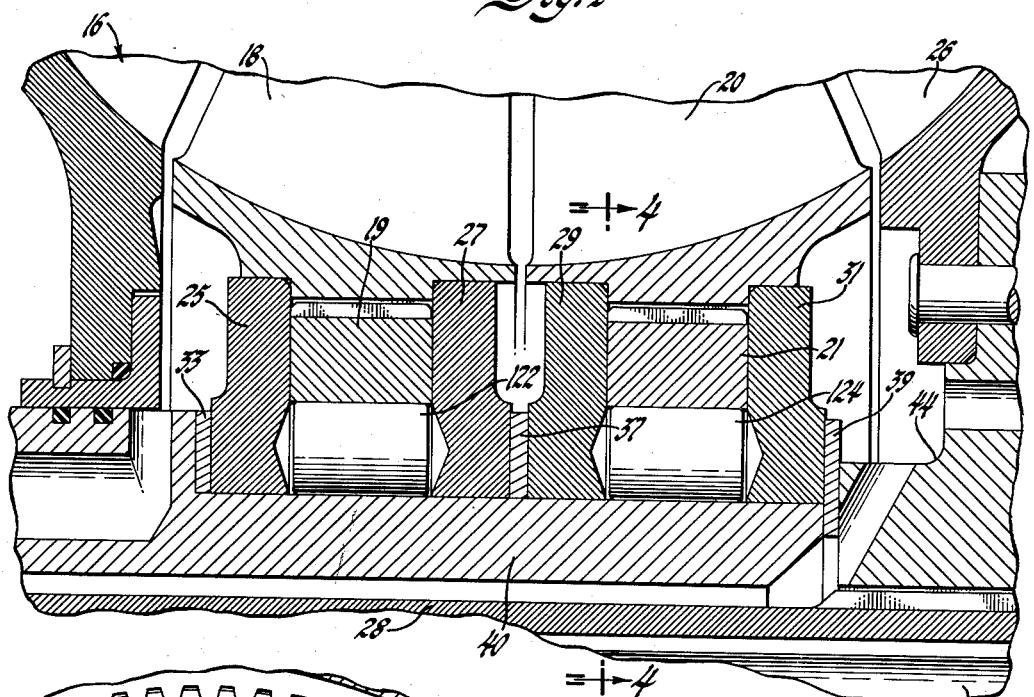
Figure 3 is a longitudinal cross section through the one-way brakes which carry the torque converter stator reaction torque.
Figure 4:
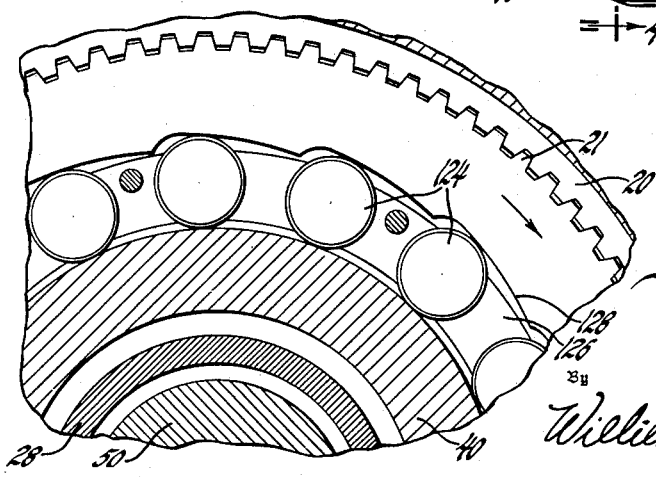
Figure 4 is a transverse cross section along the line 4—4 of Figure 3.

Referring to Figures 3 and 4, the one-way braking mechanism carrying the torque converter reactor members is shown in greater detail. The reactor members 18 and 20 are splined to members 19 and 21 respectively. These members as well as the reactor members 18 and 20 are secured from longitudinal movement by means of members 25, 27, 29 and 31. The member 25 has a thrust washer 33 bearing against the shaft 40, the members 27 and 29 have a thrust washer 37 therebetween and the member 31 has a thrust washer 39 between itself and the member 44. It may thus be seen that the reactor members 18 and 20 are secured from longitudinal movement and that the reactor member 18 rotates with the members 19, 25, and 27 as a unit while the reactor member 20 rotates with the members 29, 21 and 31 as a unit. The brake rollers 122 and 124 permit one-way torque transmission between the members 19 and 40 and the member 21 and 40 respectively.

Referring more particularly to Figure 4, it will be noted that the rollers 124 are carried by a carrier 126 and that each of these rollers ride on a ramp 128 in the member 21. The member 40 has a smooth cylindrical surface engaging the rollers 124. This shaft 40 is fastened rigidly to the housing. During normal operation the torque converter elements 14 and 26 rotate in a direction clockwise looking into the surface of Figure 4. It may thus be seen by inspection of this figure that the engagement of the rollers 124 with the ramp 128 prevents counterclockwise rotation in the elements 21 and 20 but permits clockwise rotation of these members. The action of the rollers 122 on the member 19 is identical to that of rollers 124 on member 21 and therefore the reactor member 18 is permitted to rotate clockwise but is locked from counterclockwise rotation. Under high torque conditions the members 18 and 20 act as reactors to change the direction of flow of the torque converter fluid and thus obtain torque multiplication. Under light load conditions the direction of flow of the fluid to the torque converter is such that it impinges on the back of the reactor members 18 and 20 thus causing them to overrun their anchor member 40 and the converter acts as a hydraulic coupling.

Figures 5 and 6 show the hydraulic system for controlling the transmission. For example, Figure 5 shows the mechanism for controlling forward speeds while Figure 6 particularly emphasizes the portion of the hydraulic system which is active in reverse speed. The rotary gear pump 200 shown in these figures is of conventional design and is driven by an input shaft to the torque converter. The speed of this pump therefore is a direct function of engine speed and the pump furnishes a hydraulic pressure in the line 201 at all times when the engine is running. The hydraulic pump 202 is of similar design and is driven at a speed which is a direct function of vehicle speed so as to produce a hydraulic pressure in the line 203 at all times when the vehicle is in forward motion.

The governor indicated generally at 204 in Fig. 5 consists of a rotating valve body 204' containing two valve plugs which respond to pressure and to centrifugal force, and which deliver controlled pressures from pump line 203 to passages 210 and 212. Plug 206 is weighted so as to provide its pressure delivery beginning at a low rotating speed of body 204', and plug 208 at a higher speed.

The action of these centrifugal valves 206 and 208 is like that shown in Figs. 5 and 8 and described in the specification of Letters Patent to Earl A. Thompson, U. S. 2,204,872 which issued June 18, 1940. The valve body 204' is connected to be rotated by the transmission output or driven shaft 62 through the necessary gear connections, not shown. The resultant operation of the governor 204 is described below.

The hydraulic control system is equipped with the pressure regulator 216 shown in Fig. 5a, consisting of a casing 216' bored at 218' for regulator valve 218. During normal operation, pump pressure line 201 provides pressure in the rightward end of bore 218' acting against spring 222. Check valve 238 is located between a connection to pump line 203 and the said rightward end of the bore, so that when the pressure of pump 202 rises, the check valve 238 opens, and the regulation action of valve 218 is affected by the pressure of line 203.

As valve 218 moves to the left against spring 222, it variably exposes port 274, to deliver pressure to converter line 276, and exposes port 278 to drain off overpressure to sump return line 280. The force exerted by these above mentioned fluid pressures is opposed by the force of spring 222 and is opposed by a control pressure from line 220 acting against the leftward face of the valve member 218. The pressure in line 220 is furnished from the regulated supply and varied as a function of engine throttle position as described more fully hereinafter. These opposing forces determine the pressure necessary to expose the release port 278 and thus determine the operating pressure in the system. The initial feed to the converter line 276 occurs at a given low pressure, to maintain the working space filled and under pressure so as to avoid cavitation and slip effects.

A reverse blocker valve 224 shown in Figs. 5 and 6 prevents the actuation of the reverse servo mechanism 230 at any time when the vehicle is in forward motion. The valve member 226 is forced to the right by the spring 228 at all times when there is no pressure in line 203 from driven shaft pump 202 when the vehicle is not in forward motion. When this blocker valve is to the right, fluid under pressure may be supplied to the reverse servo 230 through line 232 from the shifter valve 234 shown in Fig. 5, through passage 236 in the valve member 226. When there is pressure in the line 203 this valve member 226 is pushed to the left thus preventing actuation of the reverse servo. Pressure from the line 201 is prevented from actuating the reverse blocker valve by means of a ball check valve 238. This check valve is such as to allow pressure from the line 203 to assist pressure in the line 201 under given drive conditions but will not permit the transfer of fluid in the reverse direction from pump line 201.

The manual control of the transmission is permitted by movement of the valve member 240 in the valve block 234. The valve member 240 is connected by suitable linkage to a shifting lever convenient to the operator. This valve member has four positions of operation, namely, neutral, high range, low range and reverse which are labeled in the drawings as N, H, L and R respectively. This valve is shown in the low ratio determining position in Figures 5 and 5a and in the reverse position in Figure 6.

The valve member 242 of the control valve assembly is primarily intended to control shifting from planetary reduction gear drive to planetary one-to-one drive and vice versa. The operation of the valve is controlled by oil pressures from the conduits 210, 212 and 220, shown in Fig. 5, and by the force exerted by spring 246 on piston 244. This latter piston is also responsive to oil pressure in the line 290. This valve 242 controls the one-to-one drive clutch servo mechanism 248 and reaction brake servo 250 to cause shift of same from reduced speed drive to one-to-one drive and vice versa. This valve does not control the servo mechanism 260 which operates the clutch 12 to lock out the torque converter.

Oil pressure from the governor control pressure line 210 is used to actuate the valve member 252. The action of this oil pressure is opposed by biasing springs 254 and 258 and also by the throttle position responsive pressure in line 220 through piston 256. This valve member controls the lockup clutch servo 260 to shift the transmission from converter drive to converter locked-up drive and vice versa. The position of the throttle operated plunger 266 varies the pressure in line 220 and thereby varies the vehicle speed at which the valve 252 operates to shift to or from converter drive.

The valve 262 controls the pressure in line 220. This pressure is determined by the force exerted on the piston 262 by the spring 264. This force is varied by actuation of the plunger 266 which plunger is in turn connected by proper linkage to the engine throttle. The pressure in this line 220 as mentioned above influences the actuation of the valves 242 and 252. By this variation in pressure the vehicle speed shift points of the transmission are varied in accordance with throttle position and therefore are varied according to engine torque. The oil cooler 300 is of conventional design.

Operation in neutral

Let's assume that the vehicle engine is running and the valve 240 has been manually placed in the neutral position N. Under these conditions of operation the engine driven pump 200 pulls oil from the sump 270 through the line 272 and furnishes it under pressure to the line 201. The oil pressure in this line pushes the valve member 218 of the pressure regulator 216 to the left thus uncovering port 274 and furnishing oil through converter feed line 276 to the converter. As pressure is built up in the converter cavity, the valve member 218 is pushed further to the left thus uncovering port 278 to exhaust line 280. Pressure is thus maintained in the system at that magnitude determined by the force exerted by a spring 222 and the pressure in line 220 and exhausts the surplus oil to the sump 270 through the line 280. The valve 240 in the neutral position blocks the port 286 in the branch 284 of the line 201 thereby preventing further passage of this oil to the hydraulic control system. The reverse servo 230, the reaction brake servo 250, the lockup clutch servo 248 and the one-to-one drive servo 260 are all thereby de-energized thus preventing the transmission of any torque from the output of the converter to the wheels of the vehicle. Under these conditions of operation the converter cavity is filled with oil under pressure and rotates as a unit without the transmission of any torque to the wheels of the vehicle.

Operation in low

Let's assume that the vehicle is standing still, the engine is running at idle speed and the valve member 240 is shifted to the low position L as shown in Figure 5. Pressure is applied to the valve member 218 as described in connection with the operation in neutral and oil is furnished to the converter under pressure. Oil pressure is also exerted behind valve member 262 through oil lines 302, 304, 306, port 301 and branch line 308 of line 220 to thereby move this valve member to the left until the pressure built up behind the valve member 262 is just balanced by the force exerted by the spring 264 at the position where the port 301 is just being closed. The force exerted by the spring 264 is determined by the position of the plunger 266 and hence by the position of the engine throttle. Pressure is supplied to line 220 from the regulated supply in line 284 through port 286, lines 302, 304, 306 and port 301 and is thus modified in accordance with the balancing forces exerted on the valve member 262. The pressure in this line 220 is exerted behind the valve members 242 and 252 to urge them to the extreme right position and is also exerted behind the valve member 218 of the pressure regulator to build up the release pressure of this valve and thus increase the pressure in the converter cavity and the hydraulic system.

Pressure is also applied through lines 302, 304, 312 and 314 to the reaction brake servo 250 to engage that brake and thereby connect the output of the converter to the wheels of the vehicle through the planetary reduction gear train.

Simultaneously oil pressure is applied behind the piston 244 through port 288 and line 290 to maintain the valve 242 in its extreme right position even under the application of pressure from the lines 210 and/or 212. It may thus be seen that when the valve member 240 is in the low position, drive is always through the transmission reduction gear. The automatic control is thereby overridden forcing drive through the reduction speed gear regardless of vehicle speed. This type of operation is quite desirable when dynamic braking is desired. It is very useful, for example, when it is desired to use the engine as a brake during downhill operation. The hydraulic control system supplied by the pumps 200 and 202 provides lubrication, automatically maintains the converter working space filled, and supplies the control system valves which automatically determine the drive ratio. The governor 204 furnishes variable control pressures to apply force to the shift valves 252, 242, 262 tending to establish upshift; the accelerator pedal operated plunger 266 furnishes variable control pressures to apply force to the shift valves 252, 242, 262 tending to establish downshift and also varies the regulation characteristic of the regulator valve 218.

By this process there is controlled automatic upshift from low gear drive by which clutch 12 locks out the torque converter, and as will be understood further, clutch 48 is later engaged to provide overall one-to-one drive.

As the speed of the vehicle increases, the governor valve 206 is actuated thereby causing pressure to be built up in the line 210. This pressure under operation in low gear setting has no effect on the valve member 242 as explained above but does tend to urge the valve 252 to the left. The pressure required to urge this valve completely to the left is dependent upon the pressure in the line 220 and thus the vehicle speed at which the valve is actuated is dependent upon throttle position. When sufficient pressure is built up behind the valve 252 to force it to the extreme left position, hydraulic servo fluid is permitted to flow from the line 304 through the port 316 to the line 294 to actuate the converter lockup clutch servo mechanism 260. Under this condition of operation, the transmission drive is through the locked up converter and the transmission reduction gear train. The pressure exerted on the valve 242 by the fluid from line 290 prevents the actuation of this valve by pressure from the line 212. Therefore under medium or high speed operation and under conditions where the vehicle is going downhill at a fairly rapid speed, the drive is always through the transmission reduction gear and through the locked up converter. By referring to Figures 1 and 2, this gear train may be traced out as follows.

Torque is introduced from the engine through the shaft 2 and gear 4. The gear ratio between gears 4 and 6 is slightly less than 1 to 1 and therefore the shaft 8 together with the member 10 and impeller 14 is rotated at slightly less than engine speed. Under low speed operation the clutch 12 is disengaged and all torque is transmitted through the torque converter 16. The torque ratio between the turbine member 26 and the impeller 14 is about 4 to 1 under stall conditions. The speed ratio between the impeller and turbine member is dependent, as is common in torque converters, upon the torque being transmitted and the angular velocity of the impeller. This speed ratio is always greater than unity except under overrunning conditions.

The brake 48 is engaged thus anchoring the member 46, the shaft 50 and the sun gears 38 and 52 to the transmission casing. These two sun gears are thereby caused to act as reaction members. The hollow shaft 28 drives the planetary ring gear 32 at the speed of the turbine member 26. This drives the planet gears 34 so as to cause their carrier 35 and the ring gear 56 to rotate at a speed somewhat lower than the angular velocity of hollow shaft 28. The sun gear 52, as previously mentioned, is also locked against rotation thus causing the planet gears 36 to rotate around the sun gear with their carrier 60. The angular velocity of carrier 60 and hence that of the output shaft 62 is somewhat less than that of carrier 35. The overall speed reduction produced between these two planetary gear trains is approximately 1:6. In other words, with the sun gears 38 and 52 locked against rotation, the hollow shaft 28 rotates at 1.6 times the speed of the output shaft 62. The engine drive shaft 2 rotates at 1.04 times as fast as the hollow shaft 8 and the torque converter torque multiplication is approximately 4. Therefore in low speed the overall torque multiplication is approximately 6.65.

As engine speed is increased, the clutch 12 is engaged thus locking the impeller 14 of the torque converter 16 to the turbine member 26. This causes the ring gear 32 to be driven at the same speed as the shaft 8. In intermediate speed the brake 48 remains engaged while the clutch 30 remains disengaged and therefore the planetary gear train in intermediate is the same as it is in low. The overall torque multiplication in intermediate is therefore approximately 1.66.

As mentioned earlier in the specification, the hydraulic system is such as to maintain drive through the planetary reduction gear at all times when the shifter valve 240 is in the low position. Therefore it is not possible to get direct drive in this position.

*Operation in high*

The operation of the hydraulic system in high range is very similar to its operation when the valve 240 is in the low range position except that there is no restriction placed on the shifting into high. When it is desired to operate in high range position, the valve 240 is moved to position H. With valve 240 in this position communication of fluid pressure from the regulated supply line 284 with port 288 and line 290 is cut off. By reason of the system leakage which is permissible since the hydraulic control mechanism is incorporated into the transmission body, the pressure in line 290 is relieved. Thus, movement of valve member 242 is no longer opposed by regulated line pressure.

Let's assume the vehicle is standing still with the valve member 240 in the H position with the engine running. Under these conditions of operation, drive is through the torque converter and speed reduction gear until the vehicle has gained enough speed to actuate the low speed valve 206 in the governor 204. Pressure is then built up in the line 210 of sufficient magnitude to shift the valve 252 to the left but insufficient to shift the valve 242. This operation is identical to that described above in connection with low speed operation. As speed is increased the high speed valve 208 in the governor operates to build up pressure in the line 212 and this pressure is exerted in the cavity 318 behind the valve 242 causing this valve to move to the extreme left position where it bottoms against the piston 244. A similar shift is prevented in low speed operation by pressure in the line 290. When this valve is moved to the left, the hydraulic fluid from the reaction servo line 314 is allowed to exhaust through the port 320 by a transverse passage open to sump, thus disconnecting the reaction brake 250. Simultaneously with this action hydraulic fluid is transmitted from the line 302 through the port 322 in line 324 to the one-to-one drive clutch servo 248 to connect the transmission gear train in one-to-one drive. It is quite desirable that the brake 48 not be released before the clutch 30 is engaged. A time interval between the release of the brake and the actuation of the clutch would allow the engine to race due to no restraining force being placed on the sun gears 38 and 52. In order to prevent such racing an accumulator 315 is provided to delay slightly the release of oil from the servo motor and thus delay the release of the brake 48 until the servo 248 has a sufficient pressure built up to start engagement of the clutch 30. This time delay must not be too long or the engine will be caused to stall. Upon the completion of this shift, the reduced speed gearing is locked out of the gear train and the planetary gears all rotate as a unit giving one-to-one drive.

By referring to Figures 1 and 2, it is apparent that the speed ratio is dependent upon the actuation of the clutches and brakes which are controlled by the hydraulic system. When the control valve 240 is in the so-called high position the hydraulic system as mentioned above may cause shifting of the transmission throughout its entire torque range of high torque multiplication, intermediate torque multiplication and direct drive. When the transmission is in either high torque or intermediate torque, the drive is through the planetary reduction gears and the operation of the transmission is the same as discussed above with the valve 240 in the low position. The shifting of the valve to the high position permits the hydraulic system to lock up the planetary gear train under suitable torque and speed characteristics and thus shift the transmission into what may be called one-to-one drive or low torque multiplication. When the transmission is shifted into this latter position, the clutch 12 is engaged as is the clutch 30 while the brake 48 is in a disengaged position. Under this condition of operation, the hollow shaft 8 is driven at a speed slightly less than that of the engine driven shaft 2 and the shafts 28 and 50 are locked together with shaft 8 by means of clutches 12 and 30 respectively and therefore rotate as a unit. The sun gears 38 and 52 are splined to shaft 50 and rotate at the speed of this shaft. The ring gear 32 is splined to the shaft 28 and therefore rotates at the same speed as this shaft and the shaft 50. Therefore the carrier 35 rotates at the same angular velocity as the gears 32 and 38 thereby locking the entire gear train so that it rotates as a unit. The shaft 62 rotates at the same angular velocity as the shafts 8, 28 and 50. When the gear train is in this position the only speed reduction is that which occurs between the gears 4 and 6. Thus the speed reduction and approximate torque multiplication is equal to the gear reduction between these gears or 1.04.

*Operation in reverse*

Referring to Figure 6, assuming that the vehicle is stationary with the engine running, the operator shifts the valve member 240 to the reverse or R position. Under these conditions the pump 202 is stationary and therefore the line 203 is under zero hydraulic pressure. The spring 228 therefore pushes the valve member 226 in the reverse blocker 224 to the extreme right position. The front pump 200 or engine driven pump is operating and furnishes oil under pressure to the line 201. This pressure as mentioned previoulsy forces the valve member 218 to the left uncovering port 274 and permits pressure relief through port 278. This permits the furnishing of oil under pressure through the branch line 284 and the ports 286 and 326 and the line 297 to the reverse blocker valve 224. The valve member 226 is not subject to hydraulic fluid pressure since the vehicle is not rolling and therefore is in the extreme right position as shown in the drawing. In this position oil is allowed to flow from the line 297 through the passage 236 and line 232 to the reverse servo 230. This causes actuation of this servo to energize the reverse brake 58. Under this condition of operation, torque is transmitted from the engine through the torque converter and through the planetary gear train to the wheels of the vehicle.

Referring to Figures 1 and 2 it will be noted that when the reverse clutch or band 58 locks the ring gear 56 from rotating, there is a reversal of the direction of rotation within the planetary gear train. When operating in reverse the clutches 12, 30 and brake 48 are all in the disengaged position. Drive is from the engine shaft 2 through the members 8 and 10 to the torque converter impeller 14. The torque converter turbine member 26 drives the shaft 28 at a reduced speed thus rotating the ring gear 32 at this same reduced speed. The carrier 35 is coupled to the ring gear 56 and is therefore locked from rotation thus causing the sun gear 38 to be driven in a reverse direction to that of the ring gear 32 and at an increased angular velocity. The gear 38 drives the shaft 50 and hence drives the sun gear 52 of the second planetary train. The ring gear 56 being locked, the sun gear 52 drives the planet gears 36 so as to rotate the carrier 60 in the same direction of rotation as that of the shaft 50 or in a reverse direction to that of the shaft 28. The gear sizes are so selected that the carrier 60 and hence the output shaft 62 is driven in a reverse direction to that of the shaft 28 at a speed reduction of approximately 1.59. The torque multiplication in the converter being approximately 4.0, the overall torque multiplication in reverse under stall conditions is approximately 6.57.

In the specification and claims which follow the term torque ratio is used to denote the ratio of output torque to input torque. The terms high, low, and intermediate are used only to indicate relative values without regard to absolute values.

It is to be understood also that although the invention has been described with specific reference to a particular embodiment thereof, it is not to be so limited, since changes and alterations therein may be made which are within the full intended scope of this invention as defined by the appended claims.

I claim:

1. In a combination fluid turbine and gear drive assembly for providing a range of selected speed ratio changes between a driving shaft and a driven shaft, a fluid torque converter unit of the turbine type having an impeller constantly driven from said driving shaft, torque reaction supporting elements, and a driven rotor member, a planetary gear unit consisting of a first and second planetary group each group having a sun gear, a ring gear and meshing planet gears supported on a carrier, shafting constantly connecting the ring gear of said first group to said rotor member, a clutch having one element connected to said driving shaft and a mating element fixed to said shafting, said clutch when engaged providing driving shaft rotation of said ring gear, a second clutch having one element fixed to rotate with the sun gears of both gear groups and a mating element fixed to said shafting, said latter clutch when engaged providing a driving shaft couple between said first group ring gear and the corresponding sun gear for effecting one-to-one rotation of said ring and sun gears, a fixed connection between the first group carrier and the second group ring gear, a fixed connection between said second group carrier and said driven shaft, a brake operative to stop the rotation of said sun gears and said second clutch element and thereby establish forward reduction drive between said first group annulus gear and said second group carrier, actuation mechanisms for said clutches and said brake, a selective control effective to apply the actuator mechanism for said brake to provide converter and low gear reduction drive of said output shaft, and effective to apply the actuator mechanism for said brake and said first clutch to provide intermediate gear reduction drive, and further effective to apply the actuator mechanisms of both said clutches to provide overall one-to-one drive between said shafts, while releasing the actuator mechanism for said brake.

2. A power transmitting mechanism including; a fluid torque converter having an impeller and a turbine member, a clutch capable of locking the impeller of said converter to the turbine thereof, a planetary reduction gear train having a driving member connected in driven relationship to said turbine member, a driven member, and a reaction member, a brake for holding said reaction member so as to provide reduction of speed within said planetary gear train, a clutch capable of connecting together said driving and reaction members for unitary movement and means to actuate said clutches and brake, whereby drive between said impeller and said driven member is obtained in high torque ratio through said torque converter plus said reduction gearing by braking said reaction member; in intermediate torque ratio through said reduction gearing alone, by braking said reaction member, and locking said impeller to said turbine; and in low torque ratio by one-to-one drive through said transmitting mechanism, by locking said impeller to said turbine, and connecting said reaction member to said driving member.

3. A power transmitting mechanism including; a fluid torque converter having an impeller and a turbine member, clutch means capable of locking the impeller of said converter to the turbine member thereof, a planetary reduction gear train having a driving member connected in driven relationship to said turbine member, a driven member and a reaction member, a brake for holding said reaction member to prevent its rotation so as to provide a reduction of speed within said planetary gear train, the transmission including clutch means capable of connecting together said driving and reaction members for unitary movement, actuation means for said clutch means and said brake, a selective control mechanism for said actuation means effective to establish drive in high, intermediate and low torque ratio, whereby the drive is obtained through both said torque converter and reduction gearing for high torque ratio, through said reduction gearing alone for intermediate torque ratio and through rigid coupling of said impeller and said reaction member for low torque ratio; the sequence of high, intermediate and low ratio resulting from braking of said reaction member, braking of said reaction member and locking said impeller to said turbine, locking said impeller to said turbine and connecting said reaction member to said driving member, with release of said brake.

4. A power transmitting mechanism as claimed in claim 3, wherein means are provided for manually preventing shift from intermediate into low torque ratio, said means comprising a portion of said control mechanism operative in one setting to block the actuation of said second named clutch and the release of said brake.

5. A vehicle power transmission mechanism including; a casing, an input shaft and an output shaft, a fluid torque converter having an impeller driven by said input shaft and a turbine member, a first planetary gear train having a sun gear, a carrier, a plurality of planet gears supported by said carrier, and a ring gear, a second planetary gear train having a sun gear, a carrier, a plurality of planet gears supported by said carrier, and a ring gear, means for connecting the ring gear of said first mentioned planetary gear train to said turbine member, means connecting the carrier of said first mentioned planetary gear train to the ring gear of the second mentioned planetary gear train, means connecting the carrier of the second planetary gear train to said output shaft, a first clutch capable of clutching said impeller to said turbine member, a first brake capable of holding the sun gear of each of the above mentioned planetaries to prevent rotation for obtaining reduced speed torque transmission between the ring gear of said first mentioned planetary gear train and said output shaft, a second clutch capable of clutching said two sun gears to the ring gear of the first mentioned planetary gear train so as to lock said gear trains to provide rotation as a unit and thereby obtain a one-to-one drive connection between said turbine member and said output shaft, a second brake capable of anchoring the ring gear of said second planetary gear to prevent rotation, and speed responsive means for causing energization of said first brake at low vehicle speeds, said first clutch and brake at intermediate speeds, and said first and said second clutches while causing de-energization of said first named brake at high vehicle speeds whereby a high and intermediate and a low torque ratio is obtained between said output and said input shafts in the stated sequences.

6. A vehicle transmission mechanism as claimed in claim 5 including; actuating means for said clutches and said brakes, a selective control mechanism for said actuating means, a portion of said control mechanism comprising a time delay means operable for preventing the simultaneous actuation of said first brake and said second clutch when said control mechanism is made operative to select drive by both of said clutches.

7. A vehicle power transmission mechanism including; a casing, an input shaft and an output shaft, a fluid torque converter having an impeller driven by said input shaft and a turbine member, a first planetary gear train having a sun gear, a carrier, a plurality of planet gears supported by said carrier and a ring gear driven by said turbine, a second planetary gear train having a sun gear, a carrier, plurality of planet gears supported by said carrier and a ring gear, means for connecting the carrier of said first mentioned planetary gear train to the ring gear of said second mentioned planetary gear train, means for coupling the carrier of said second planetary gear train to said output shaft, a first clutch capable of clutching said impeller to said turbine member, a friction device capable of holding the sun gears of each of the above mentioned planetary gear trains to prevent rotation for obtaining reduced speed torque transmission between the ring gear of said first mentioned planetary gear train and said output shaft, a clutching means capable of clutching said two sun gears to the ring gear of the first mentioned planetary gear train so as to lock said gear trains to provide rotation as a unit and thereby obtain a one-to-one drive connection between said turbine member and said output shaft, a friction member capable of anchoring the ring gear of said second planetary gear train to prevent rotation, individual actuator mechanisms for said clutches, said device and said friction member, a selective control effective to cause operation of said individual actuator mechanisms and speed responsive means operable upon said control for causing actuation of said device at low vehicle speeds, of said first clutch and said device at intermediate speeds, and of both said clutches at high vehicle speeds whereby a high and intermediate and low torque ratio is obtained between said output and said input shafts, and manual control means cooperating with said selective control and operative to prevent the speed responsive means from causing actuation of both said clutches simultaneously at high speed.

8. A vehicle transmission mechanism as claimed in claim 7 including; time delay means cooperating with said selective control for preventing the simultaneous action of said device and said second mentioned clutch.

9. A vehicle power transmission mechanism including; a casing, an input shaft and an output shaft, a fluid torque converter having an impeller driven by said input shaft and a turbine member, a first planetary gear train having a sun gear, a carrier, a plurality of planet gears supported by said carrier and a ring gear driven by said turbine member, a second planetary gear train having a sun gear, a carrier, a plurality of planet gears supported by said carrier and a ring gear, means connecting the carrier of said first mentioned planetary gear train to the ring gear of said second mentioned planetary gear train, means connecting the carrier of said second planetary gear train to said output shaft, a first clutch capable of clutching said impeller to said turbine member, a brake capable of braking the sun gears of each of the above mentioned planetary gear trains to prevent rotation for obtaining reduced speed torque transmission between the ring gear of said first mentioned planetary gear train and said output shaft, a second clutching means capable of clutching said two sun gears to the ring gear of the first mentioned planetary gear train so as to lock said gear trains to provide rotation as a unit and thereby obtain a one-to-one drive connection between said turbine member and said output shaft, a second braking member capable of anchoring the ring gear of said second planetary gear train to prevent rotation, actuation mechanisms for said clutches and said brakes, selective controls for said actuator mechanisms operable automatically and manually for providing different forward and reverse speed drive ratios between said shafts, and speed responsive means for operating said controls automatically so as to cause actuation of said first brake at low vehicle speeds, said first clutch and first brake at intermediate speeds, and said first and second clutches at high vehicle speeds whereby a high, intermediate and low torque ratio is obtained between said output and input shafts automatically in accordance with speed, manual control means cooperating with said selective controls and settable for preventing the speed responsive means from causing actuation of said first and second clutches simultaneously at high speed, a portion of said manual control means shiftable for causing actuation of said second braking member to obtain reverse drive, and automatic control means operative when said vehicle is in forward motion for preventing the operation of said last mentioned manual control means portion from causing actuation of said second braking member.

10. A vehicle transmission mechanism as claimed in claim 9 including; time delay means cooperating with said selective control and operable for preventing the simultaneous actuation of said first brake and said second clutch.

11. An angle drive power transmission for vehicles including; a longitudinally arranged casing, an input power shaft supported in one side of said casing and projecting into same, a planetary type change speed gear train supported in one end of said casing and driving a driven shaft supported in that end of the casing, said train having a coupling shaft, a torque converter and clutching members for controlling said planetary gear train located and supported in the opposite end of said casing, a driving impeller drum for said converter constantly driven by said input power shaft, said drum constituting the driving element for one of said clutching means, cover plates located on said side of and at each end of said casing supporting said input shaft and said coupling and driven shafts respectively said plates being individually removable so as to permit individual assembly and disassembly of said input shaft, of said planetary gear train and of said torque converter and clutching members respectively.

12. In combination with a vehicle provided with an engine and a change speed transmission, a transmission input shaft connected with said engine and an output shaft for propelling said vehicle, a reversing mechanism for said output shaft, a fluid pressure servo for actuating said reversing mechanism, a first fluid pressure source adapted to deliver pressure when said engine is operating, control means for directing fluid from said first source to said servo comprising a manually actuated valve to permit energization of said servo, a fluid pressure actuated valve to prevent energization of said servo, and a second source of fluid pressure operative when said vehicle is in forward motion to close said fluid pressure actuated valve, whereby said manually actuated valve is rendered ineffective to cause actuation of said reversing mechanism when said vehicle is in forward motion.

13. In combination with a vehicle provided with a speed change transmission, a driving shaft and a driven shaft for propelling said vehicle, a reversing mechanism for said driven shaft, a fluid pressure servo for actuating said reversing mechanism, a fluid pressure source for energizing said servo, control means for connecting said source to said servo including a manually actuated valve in series with a fluid pressure actuated valve, biasing means tending to open said fluid pressure actuated valve, fluid pressure supply means effective only when said vehicle is in forward motion to close said fluid pressure actuated valve, said manually actuated valve selectively movable from closed to open position and effective to energize said servo and actuate said reversing mechanism only when both of said valves are in the open position.

14. A vehicle having an engine driven transmission including an input shaft and an output shaft, torque ratio determining means and output drive reversing means, fluid pressure servoes for selectively actuating said torque ratio determining means and said drive reversing means, a first fluid pressure pump driven by said engine, control means including a plurality of shift valves for directing fluid pressure from said engine driven pump to energize said servoes selectively to determine the transmission torque ratio, a manually actuated valve having a plurality of positions for selectively conditioning said shift valves for operation and one position for determining a given transmission torque ratio and for energizing said drive reversing servo, a blocker valve operative when closed to prevent energization of said drive reversing servo and operative when open to permit energization of said drive reversing servo only when said manual valve is in said one position, biasing means tending to open said blocker valve, said blocker valve adapted to be closed by fluid pressure, a second fluid pressure pump driven by said output shaft and connecting means between said second pump and said blocker valve whereby it is closed in response to one direction of rotation of said output shaft whereby actuation of said drive reversing means is prevented.

15. In combination with a vehicle provided with a speed change transmission, a driving shaft and a driven shaft for propelling said vehicle, a reversing mechanism for said driven shaft, a fluid pressure servo for actuating said reversing mechanism, a fluid pressure source driven by said engine for energizing said servo, control means for connecting said source to said servo including a manually actuated valve in series with a fluid pressure actuated valve, each of said valves having open and closed positions, biasing means tending to open said fluid pressure actuated valve, fluid pressure supply means driven by said driven shaft effective when said vehicle is in forward motion only to close said fluid pressure actuated valve, said manually actuated valve selectively movable from closed to open position and effective to energize said servo and actuate said reversing mechanism only when both of said valves are in the open position.

16. In a vehicle transmission, an input shaft, an output shaft, means including gearing connecting said shafts, a first servo operative on the supply of fluid under pressure to control said gearing to cause said output shaft to be driven in the forward direction by said input shaft, a second servo operative on the supply of fluid under pressure to control said gearing to cause said output shaft to be driven in the reverse direction by said input shaft, a first pump driven in synchronism with said input shaft and supplying fluid under pressure to a supply passage, a second pump driven in synchronism with said output shaft and supplying fluid under pressure to said supply passage, said second pump being effective to supply fluid to said supply passage only when said output shaft turns in the forward direction, a check valve between said second pump and said supply passage arranged to prevent flow from said supply passage to said second pump, a control valve, means for biasing said control valve to its open position, means subject to the pressure of the fluid intermediate said second pump and said check valve for moving said control valve to its closed position, a manual valve, means operative in one position of said manual valve to supply fluid from said supply passage to said first servo, and means operative in another position of said manual valve to supply fluid from said supply passage to said second servo only when said control valve is in its open position.

References Cited in the file of this patent

UNITED STATES PATENTS

| | | |
|---|---|---|
| Re. 22,967 | Nutt et al. | Jan. 27, 1948 |
| 2,203,380 | Carter et al. | June 4, 1940 |
| 2,214,335 | Kurti | Sept. 10, 1940 |
| 2,327,647 | Jandasek | Aug. 24, 1943 |
| 2,343,955 | Cotterman | Mar. 14, 1944 |
| 2,408,951 | Pollard | Oct. 8, 1946 |
| 2,435,930 | Schjolin | Feb. 10, 1948 |
| 2,516,203 | Greenlee | July 25, 1950 |
| 2,528,584 | Farkas | Nov. 7, 1950 |
| 2,568,007 | Jandasek | Sept. 18, 1951 |
| 2,603,109 | Farkas et al. | July 15, 1952 |

FOREIGN PATENTS

| | | |
|---|---|---|
| 607,120 | Great Britain | Aug. 26, 1948 |
| 836,329 | France | Oct. 10, 1938 |